(12) United States Patent
Berglund

(10) Patent No.: US 6,283,112 B1
(45) Date of Patent: Sep. 4, 2001

(54) SAW MEMBER, LINK OF SAW MEMBER AND A METHOD OF PRODUCING A SAW MEMBER

(76) Inventor: Björn Berglund, Gärdesvägen 7, SE-793 32 Leksand (SE)

(*) Notice: Subject to any disclaimer, the term of this patent is extended or adjusted under 35 U.S.C. 154(b) by 0 days.

(21) Appl. No.: 09/355,083

(22) PCT Filed: Jan. 28, 1998

(86) PCT No.: PCT/SE98/00124
§ 371 Date: Jul. 23, 1999
§ 102(e) Date: Jul. 23, 1999

(87) PCT Pub. No.: WO98/32578
PCT Pub. Date: Jul. 30, 1998

(30) Foreign Application Priority Data

Jan. 29, 1997 (SE) .................................................. 9700265

(51) Int. Cl.[7] .................................................. B28D 1/08
(52) U.S. Cl. .............................. 125/21; 451/298; 83/830; 83/831
(58) Field of Search .................................... 451/298, 296; 125/21, 22; 83/830, 831, 832, 651.1

(56) References Cited

U.S. PATENT DOCUMENTS

| | | |
|---|---|---|
| 2,679,839 | 6/1954 | Metzger . |
| 3,661,137 | 5/1972 | Prowse et al. . |
| 4,898,057 * | 2/1990 | Hille .................................... 83/831 |
| 4,920,947 * | 5/1990 | Scott et al. ............................ 125/21 |
| 4,971,022 | 11/1990 | Scott et al. . |
| 5,184,598 * | 2/1993 | Bell .................................... 125/21 |
| 5,305,730 * | 4/1994 | Fish .................................... 125/21 |
| 5,718,216 * | 2/1998 | Plattner ............................... 125/21 |
| 5,735,259 * | 4/1998 | Hoerner et al. ..................... 125/21 |

FOREIGN PATENT DOCUMENTS

| | | |
|---|---|---|
| 3811265 | 10/1989 | (DE) . |
| 0160625 | 11/1985 | (EP) . |
| 0376128 | 7/1990 | (EP) . |
| 0822023 | 2/1998 | (EP) . |
| 359767 | 9/1973 | (SE) . |
| 8603681 | 11/1988 | (SE) . |

OTHER PUBLICATIONS

Derwent's abstract, No. 89–67455/09, week 8909, Abstract of SU, 1418058 (Vniialmaz Diamond), Aug. 23, 1988.
Derwent's abstract, No. 90–35157/05, week 9005, Abstract of SU, 1470543 (Subbotin E K), Apr. 7, 1989.

* cited by examiner

*Primary Examiner*—Eileen P. Morgan
(74) *Attorney, Agent, or Firm*—Young & Thompson

(57) ABSTRACT

A cutting member for cutting hard materials such as rock, concrete, etc., includes a support unit in the shape of a wire. The free ends of the wire are joined together to form an endless unit. Cutting elements are provided at regular distances from each other along the full length of the wire. Each cutting element is firmly connected to a cutting element carrier and supported on the wire and at least in the mounted condition is firmly connected to a rider for guidingly engaging a portion of a saw. Driver members are attached to the wire and the cutting element carriers are floatingly supported on the wire in functional engagement with the driver members.

16 Claims, 5 Drawing Sheets

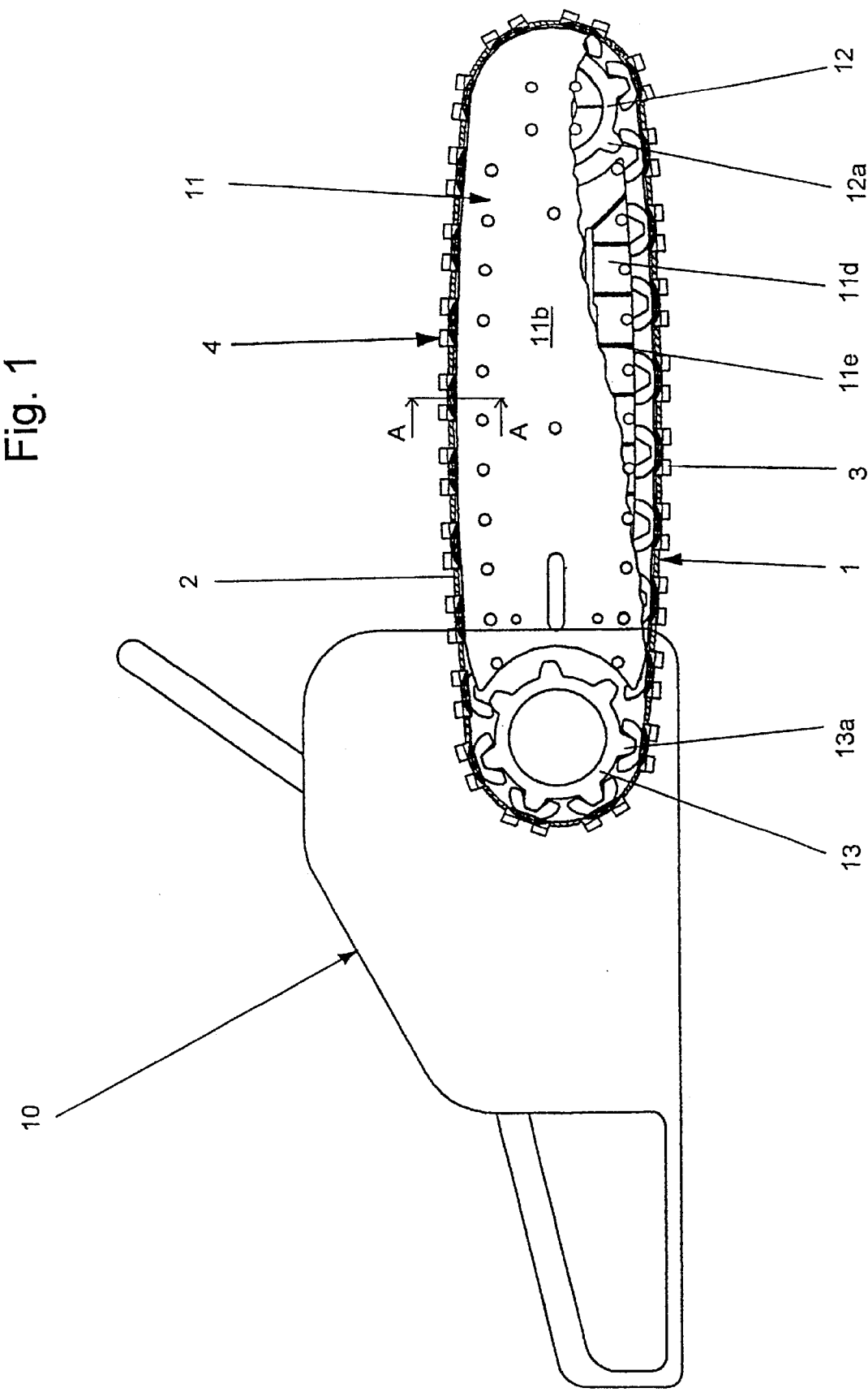

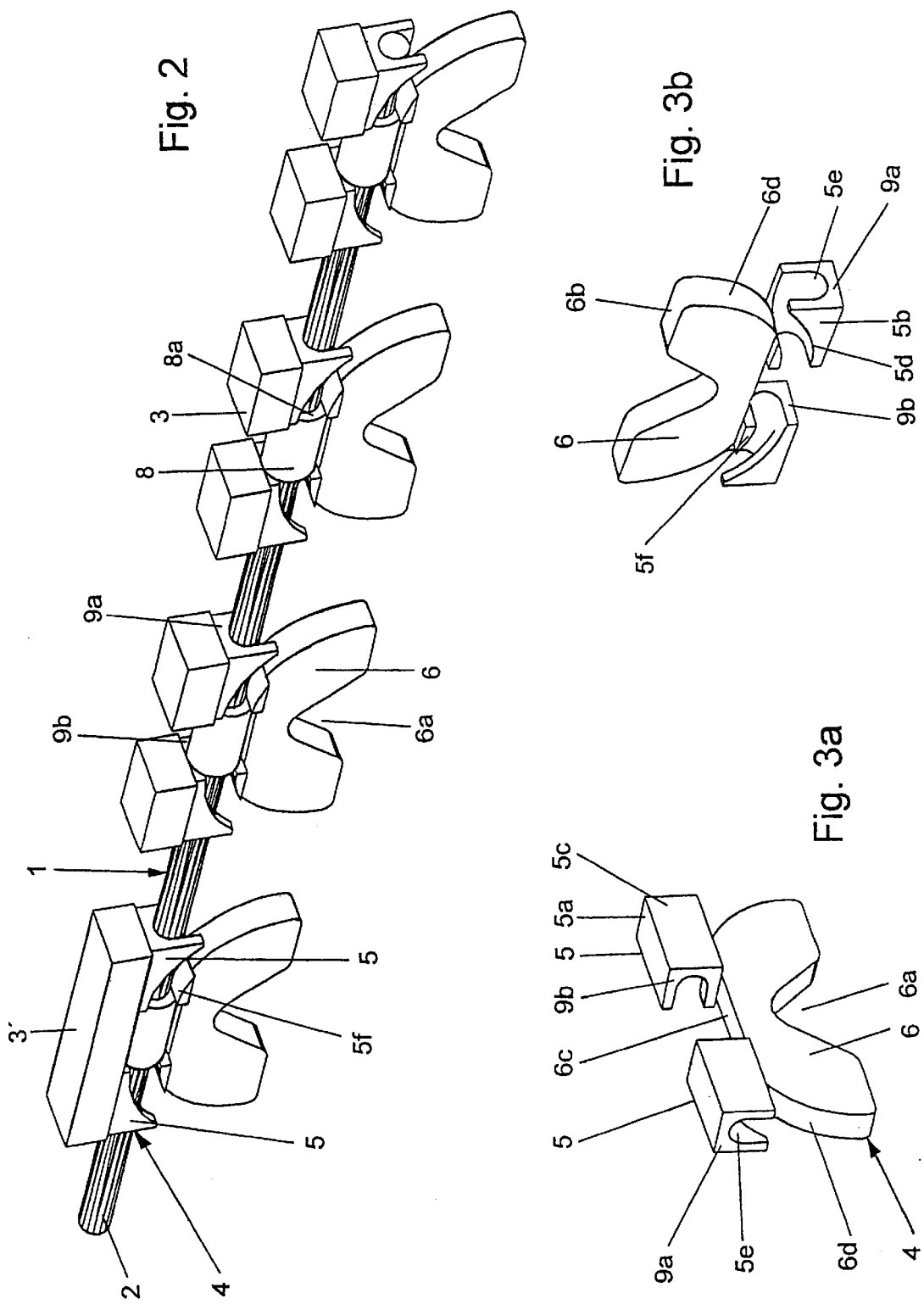

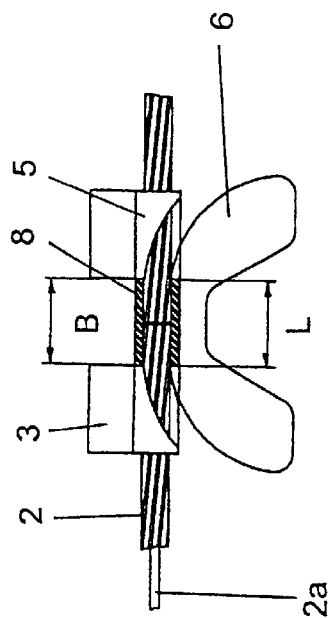
Fig. 5
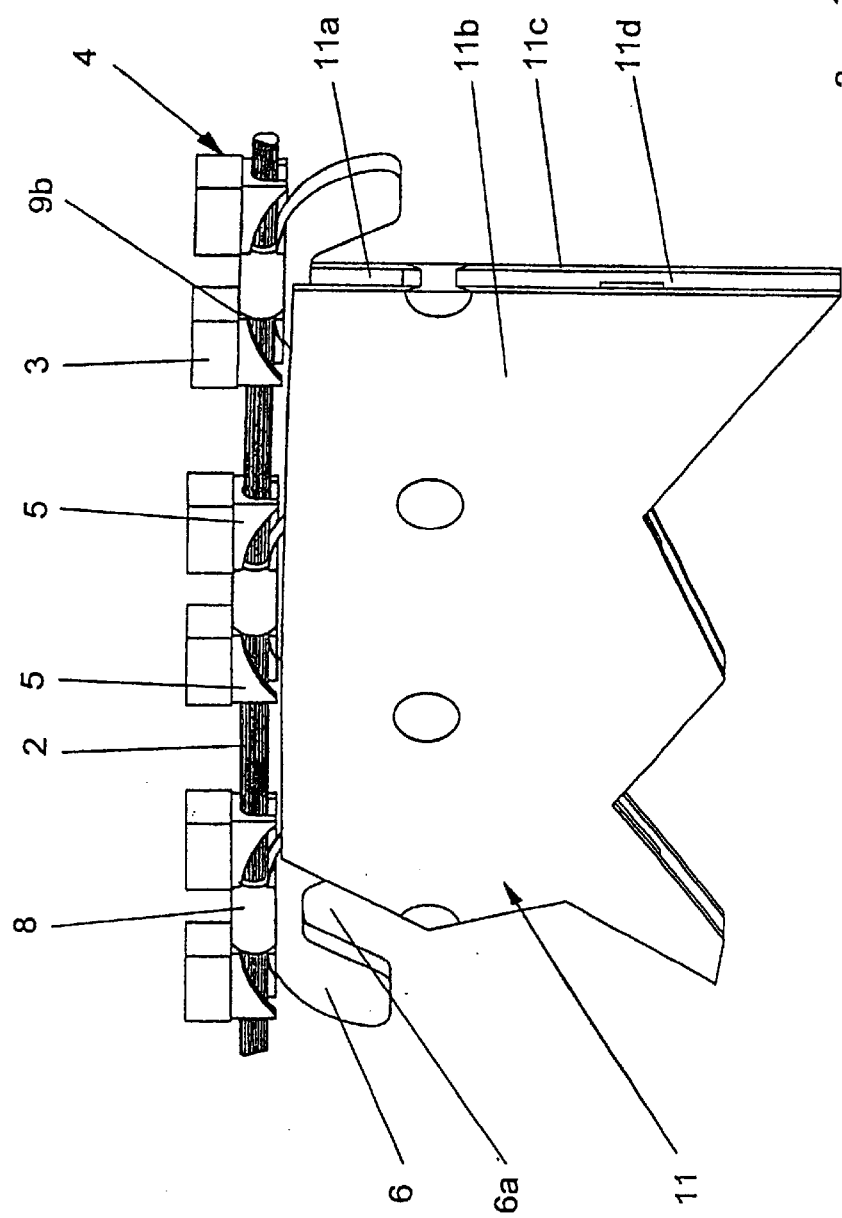
Fig. 6
Fig. 4

SAW MEMBER, LINK OF SAW MEMBER AND A METHOD OF PRODUCING A SAW MEMBER

BACKGROUND OF THE INVENTION

The present invention relates generally to the field of cutting or sawing harder materials such as concrete, brick, stone, etc., and more specifically relates to a cutting member, a link for a cutting member and a method of forming a cutting member, of the kinds indicated in the preambles of patent claims 1, 11 and 12 respectively.

For cutting harder materials of the kind indicated in the introduction there are many available alternatives, whereby a basic distinction is made between portable saws and saws connected to or supported by a frame. Portable units, predominantly for cutting concrete and bricks, are presently available on the market in the shape of circular saws, chain saws or so called ring saws, which as specified by the name employ a circular blade, a chain and an eccentrically driven ring respectively for carrying a number of cutters or cutting elements provided at regular distances from each other. Of said mentioned saws the circular blade saws and ring saws suffer from a restricted cutting depth due to practical limitations with regard to the diameter of the ring or the circular blade, and they also suffer from the disadvantage that when they are employed for forming an opening in for instance concrete they produce a substantial eccessive cutting or sawing at the corners, which is not acceptable primarily due to the danger of cutting off reinforcement bars and the decreased strength associated therewith. Saws having a chain, i.e. basically designed by interconnected links in the same manner as a saw chain for sawing into wood, do indeed have the advantage compared to circular blade saws and ring saws that they eliminate the problem of eccessive cutting and at the same time allow for a greater sawing or cutting depth to be obtained, but instead they suffer from the disadvantage that the cost of replacing cutters or cutting elements on the chain is comparatively high and in many cases unacceptable.

Saws connected to frames or stands are available both for cutting concrete and brick and for cutting stone or rock, and within this category there are likewise saws which work with a chain of a conventional type and which therefore suffer from the above-mentioned drawback (see for instance SE, B, 8603681-1). For saws connected to stands cutting members have also been developed which consist of cutting elements threaded onto a wire or the like and primarily intended for use in "floating" cutting, i.e. without any underlying guide in the shape of a saw guide bar or the like. Such cutting members are described for instance in SE, B, 359 767 and EP-A-0 160 625 and as the support unit they employ a wire onto which sleeve-like cutting elements are threaded, said cutting elements being provided with a cutting surface around their periphery. Apart from the fact that it is practically impossible to replace individual worn out cutting elements on these known cutting members, due to the design of the cutting members these are only possible to use for "floating" cutting. Due to the fact that the cutting member according to the first-mentioned document is formed by providing cutting elements freely rotatable on the wire and carrying members firmly connected to the wire, alternatingly on the wire the saw member becomes very stiff so that it can only be bent with a relatively large radius. The same applies in principle also to the last-mentioned one of the above named documents, by which the entire wire and the cutting elements are encapsulated in a layer of thermoplastic material, which likewise renders the saw member rigid, i.e. having a high flexural rigidity.

Finally, EP-A-0 376 128 discloses a cutting member of the kind mentioned in the introduction, from which the present invention starts. In this document a cutting member is described which is in the shape of a wire as the support unit and which has cutting elements provided integral therewith. Thereby, the cutting elements are firmly connected to cutting element carriers which in turn are rigidly attached to the wire, primarily by means of soldering or brazing. When brazing or soldering such a cutting element carrier to a wire the solder will however creep out a relatively long distance into the wire and will thereby stiffen the wire such that it cannot be bent with any small radius. It is stated in very general terms in the above-mentioned document that the cutting element carriers may be attached to the wire by applying pressure thereto, but it is not clear in any detail how this should be performed. In such a case a direct locking of the cutting element carriers to the wire along their entire length also takes place, which in turn means that the wire in its entirety becomes relatively bending stiff. Moreover the direct locking of the cutting element carriers to the wire causes problems and high costs when replacing damaged or worn out cutting elements.

SUMMARY OF THE INVENTION

The basic object of the present invention is therefore, starting from the prior art specified in the introduction, to provide a cutting member and a method of forming such a cutting member, by means of which the above discussed shortcomings of the prior art may be eliminated.

According to the invention the above stated, basic object is achieved by means of a cutting member. a link therefore and a method of forming such a cutting member respectively, which comprise the characterizing features according to patent claims 1, 11 and 12 respectively.

Further developments of the invention and its basic principles are stated in the dependent subclaims.

BRIEF DESCRIPTION OF THE DRAWINGS

The further objects, features and advantages of the invention are described more closely below in connection with an exemplifying embodiment thereof, which is illustrated in the enclosed drawings. In the drawings:

FIG. 1 is a plan view from one side of a first embodiment of a cutting member according to the invention employed on a partially very schematically illustrated portable saw, FIG. 2 illustrates in partially perspective view a portion of the cutting member according to FIG. 1, FIGS. 3a, 3b illustrate in perspective views a unit of the cutting member according to FIG. 2, consisting of rider and cutting element carrier, illustrated without cutting element, FIG. 4 illustrates in a partial perspective view, a portion of the cutting member according to FIG. 1 supported on and guided in the saw guide bar, FIG. 5 illustrates a cross-section along the line A—A in FIG. 1, FIG. 6 illustrates an embodiment of the joint in the support unit of the cutting member according to the invention.

Figure 7:
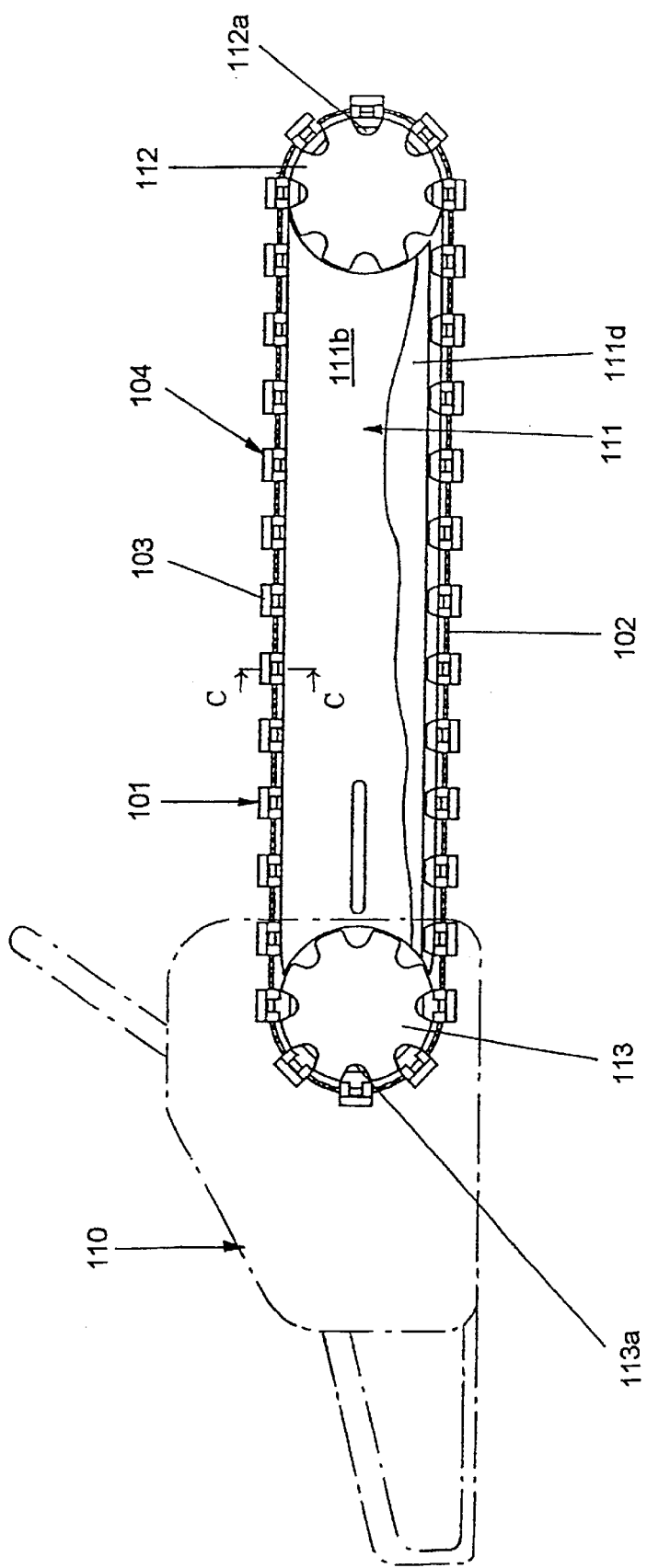
FIG. 7 illustrates in a plan view from one side, a second embodiment of the cutting member according to the invention employed on a partially very schematically illustrated portable saw.

The cutting member 1 according to the invention is illustrated in FIG. 1, as well as in FIGS. 4, 5, 7, 8 and 9, fitted to a very schematically illustrated portable saw which may be designed according to the same principles as a conventional chain saw, but which is preferably provided with a hydraulic, not illustrated motor. Thus, the cutting member is illustrated passed around the drive wheel of the saw, which is attached to the output shaft, not illustrated, of the motor, around a saw guide bar and around a nose wheel. Although the invention is described herein with specific reference to embodiments where it is used on a portable saw and, as will be made clear below, although its advantages have their greatest effect in such a use, it is nevertheless applicable to other types of saws, such as different types of saws supported by frames.

DESCRIPTION OF A PRESENTLY PREFERRED EMBODIMENT

In the first embodiment illustrated in FIGS. 1–6 the cutting member does, in a manner which is in itself conventional, consist of a support unit 2 in the shape of a steel wire which, in a way more closely described below, is joined together so as to form an endless unit and on which cutting elements 3 are supported at predetermined, regular distances from each other along the entire length of the wire 2. In a preferred embodiment the cutting elements 3 consist of synthetic diamond (boron nitride) and are supported on the wire 2 by means of cutting element carriers 4. As is illustrated in FIG. 2 each cutting element carrier 4 may in the illustrated embodiment carry either two separate cutting elements 3 separated along the length of the carrier or one elongate cutting element 3' extending substantially the fill length of the carrier, whereby the first-mentioned alternative is presently preferred.

More specifically, in the first embodiment, each of the cutting element carriers or links 4 are produced in one piece, preferably formed integrally through precision casting, preferably from a suitable steel grade. Thereby, the links are provided with a rider portion 6 and two carrier portions 5, the carrier portions serving to guide the cutting member 1 around the saw guide bar 11, the drive wheel 13 and the nose wheel 12 and to transmit the drive power from the drive motor, not shown, of the saw 10 to the cutting member 1. More specifically, a recess 6a in the lower, otherwise substantially planar edge 6b of the rider portions, which in operation is facing the saw guide bar, engages complementary teeth 12a, 13a or the like on the drive wheel 13 and the nose wheel 12 respectively, and between said wheels the rider portions are guided in a groove 11a of the guide bar 11, whereby said groove in a conventional manner may be delimited by side plates 11b, 11c and a middle plate 11d of the guide bar (see especially FIGS. 4 and 5). The middle plate 11d may thereby suitably be provided with channels 11e, indicated in FIG. 1, for guiding cooling water to the cutting member 1.

The rider portion 6 is furthermore provided with a likewise substantially planar upper edge 6c and the upper and lower edges 6c and 6b respectively are at either side of the rider portion connected to each other through arcuate side edges 6d, said arcuate shape being intended for allowing the fitting or mounting of the cutting element carriers 4 onto the wire 2, as will be described further below.

At the upper edge 6c of the rider portion 6 the cutting element carriers 4 are provided with the two carrier portions 5 which are spaced apart by a distance B from each other and which are intended to receive the wire 2 in the manner which will be described more closely below. These carrier portions 5 which are integral with the rider portion 6, as has been mentioned above, have, for their above-mentioned purpose, a relatively complex shape which, specifically with reference to FIGS. 3a and 3b, may be easiest described starting from the basic shape of a right angle prism which is processed to its final shape. Although the link 4, as mentioned above, is preferably manufactured by means of precision casting a corresponding processing is necessary when producing the mould.

Starting from such a shape the carrier portion 5 is bored through from an outer edge surface 9a for forming a groove 5e intended for receiving the wire 2. Thereupon an aperture 5d is milled in the outer, with reference to the direction of insertion of the wire into the link, long side 5b of the carrier portion and this aperture having an arcuate shape with the same radius as that of the edge surfaces 6d of the rider portion 6, allows for the insertion of the wire in the manner described more closely below. In the region of the inner edge surface 9b of the carrier portion the aperture is thereby milled such that it joins and forms a continuation of the through bore or groove 5e. Finally the groove 5e is opened up downwardly through milling at the outer edge surface 9a.

At the portion of a lower long side 5f remaining after the processing, the carrier portion is connected to the upper edge 6c of the rider portion, and at an opposite upper, uninterrupted long side 5a the carrier portion carries a cutting element 3 or a portion of a cutting element 3', see FIG. 2, whereby the cutting elements are preferably brazed to the carrier portions. In accordance with the above it is clear that the inner long side 5c of the carrier portion is likewise uninterrupted and provides support for the fitted wire.

With regard to the above it is clear that the two carrier portions 5 are provided at a distance B (FIG. 6) from each other, and as is illustrated in the drawings said carrier portions are provided mirror-inverted, whereby this design permits easy introduction of the wire 2 through the apertures 5d of the carrier portion and reliable accomodation thereof in the groove 5e. In this connection it should be emphasized that the radius of the arcuate shape of the apertures 5d and of the side edges 6d should be less than the radius of the nose wheel 12 and the drive wheel 13 of the saw 10, in order to secure that the wire is supported outwardly at the outer long side 5b of the carrier portion 5 even when it is running round these wheels 12, 13.

Furthermore the width of the groove 5e should be at least as great as, but preferably slightly larger than the outer diameter of the wire 2 to permit secure accomodation of the wire 2 therein, as is clear from for instance FIG. 2.

The distance B between the carrier portions 5 on each link serves the purpose of allowing for accomodation of driver members 8 which are firmly attached to the wire 2 at said positions at regular distances from each other. The driver members 8 consist of sleeves, preferably of metal. threaded onto the wire before joining together the same and firmly connected or fixed thereto by means of clamping, i.e. by applying a high mechanical pressure thereto, around substantially their entire circumference.

The driver members are significantly shorter, seen along the wire 2 in the assembled condition, than the cutting element carriers 4. The distance B between the carrier portions 5 is thereby made at least equal to, but preferably slightly larger than the length L (see FIG. 6) of the driver members 8, such that the driver members 8 in the fitted or mounted condition are received between the carrier portion 5 in the central region of the cutting element carriers 4 with a slight play in the longitudinal direction of the wire 2. Furthermore, the driver members 8 are sized such that their outer diameter after the compression locking to the wire at least approximately corresponds to the distance between the outer and inner sides 5b and 5c respectively of the carrier portions 5. Thereby the inner edge surfaces of the carrier portions form stop members 9b intended to contact, i.e. to be brought into functional engagement with the end edges 8a (see FIG. 2) of the driver members 8 and to thereby establish an indirect connection between the wire 2 and the cutting element carriers 4.

As is indicated in FIG. 4 the wire 2 is suitable joined together by attaching a driver member 8 over the ends of the wire that are brought together, whereby this driver member 8 is secured to the wire in the manner described above and is utilized in the same manner as the remaining driver members, for establishing a functional engagement with a cutting element carrier 4. FIG. 6 illustrates a simple bringing together of the ends of the wire 2 at the joint, but a substantially stronger joint is obtained if the wire ends are spliced together at the joint. In order to increase the flexibility of the wire it is suitable to use a wire having a nylon core 2a (indicated in FIG. 6), whereby a simple but at the same time very strong joint may be achieved by loosening or unwinding the strands of the wire at their ends and by removing a piece of the nylon core at each end, said piece at least corresponding to half the length L of the driver members 8, whereupon a "fake splicing" of the strands of the wire ends may be achieved without altering the outer dimension of the wire to any essential degree in the area of the joint. The expression "face splicing" thereby refers to a simple braiding of the strands.

From the above it is clear that the cutting member 1 according to the invention is produced by threading driver members 8 onto the wire 2 and by fixing them by clamping on the wire at the predetermined positions at regular distances from each other, whereby one driver member 8 in the succession of members is attached covering the joint. Then, cutting element carriers 4 having cutting elements 3 or 3' brazed thereto are fitted to the wire 2 such that they straddle the wire, and with a driver member 8 accomodated between the carrier portions 5. From the above description as well as from especially FIGS. 2, 4 and 5 is thereby clear that this fitting or assembly is performed such that the wire 2 is bent slightly so as to be shaped corresponding to the apertures 5d at the free sides 5b of the carrier portions and the arcuate shape of the side edges 6d of the rider portions. Bent in such a manner the wire 2 passes clear from the rider portion and the carrier portions and may be inserted sideways towards the web 5c of the carrier portions, with the driver means 8 fitted between the carrier portions 5, and then the assembly is completed by unloading the wire 2 such that it is inserted into the grooves 5e of the carrier portion.

The described, first embodiment provides a design that is especially advantageous in the sense that, apart from the fact that it makes it possible to achieve the basic objects of the invention, it also contributes to increasing the stability of the cutting member, by the fact that in operation the cutting member is positioned closer to the guide bar of the saw. The integral design of the links 4 as one unit makes this possible.

Figure 9:
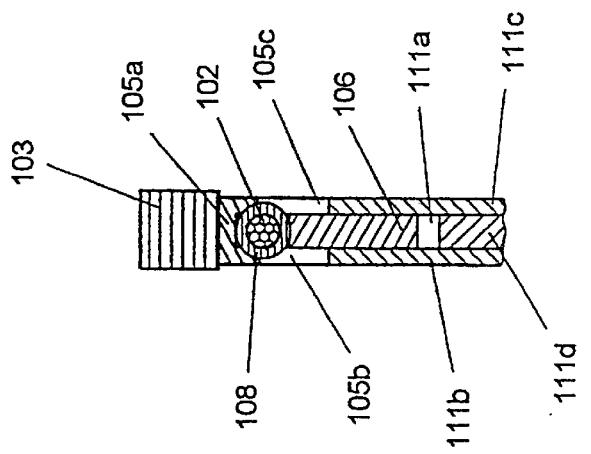
FIG. 9 is a cross-section along the line C—C in FIG. 7, and FIG. 10 schematically illustrates a joint of the cutting member according to FIG. 7.
Figure 8:
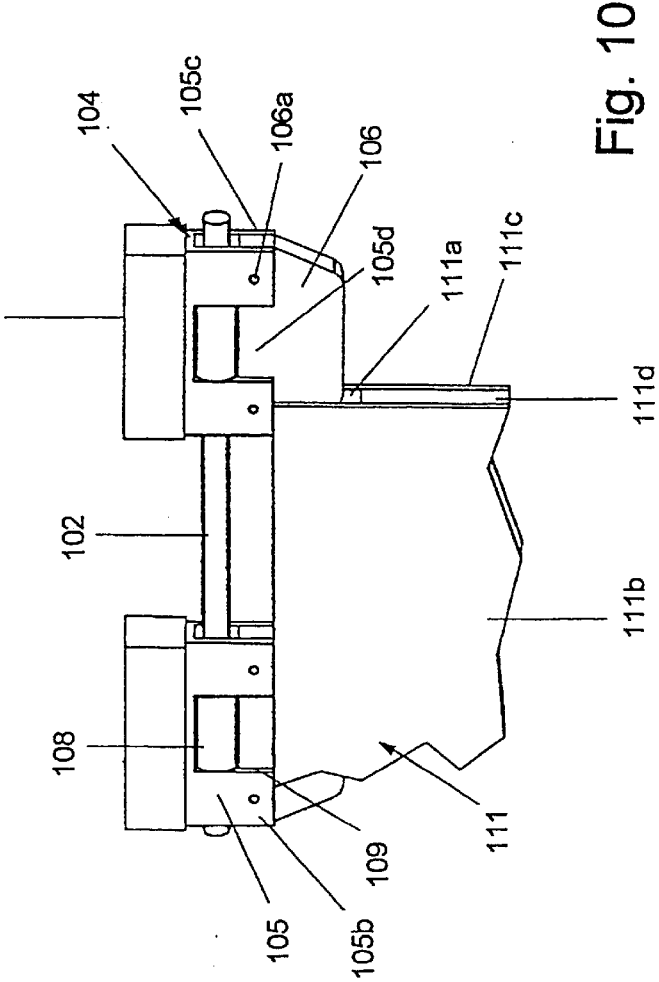
FIG. 8 illustrates in a partial perspective view a portion of the cutting member according to FIG. 7 supported on and guided in the saw guide bar.

FIGS. 7–9 illustrate an alternative embodiment of the invention, whereby FIG. 7 likewise illustrates a cutting member 101 according to said second embodiment of the invention, fitted to a very schematically illustrated portable saw 10, passed around the drive wheel 113 of the saw, around a guide bar 111 and around a nose wheel 112. Here, the cutting member 101 likewise consists of a support unit 102 in the shape of a steel wire having cutting elements 103 supported thereon at predetermined, regular distances from each other along the wire 102. However, in contrast to the above described first embodiment the cutting element carriers 104 are here formed by a generally U-shaped clamp 105 having an upper web 105a to which a cutting element 103 is brazed. From each long side of the web 105a a pair of substantially parallel legs 105b, 105c are extended. The inner, free space between the legs 105b, 105c is thereby at least as large as, but preferably slightly larger than the outer diameter of the wire 102, such that the cutting element carriers 104 may be arranged so that they straddle the wire 102 with the legs 105b, 105c, as is illustrated for instance in FIG. 9. Substantially centrally on each leg 105b, 105c downwardly opening recesses 105d are provided, the purpose of which is to accomodate or receive driver members 108 which may be identical to those of the first embodiment and which will therefore not have to be described in any detail.

Figure 10:
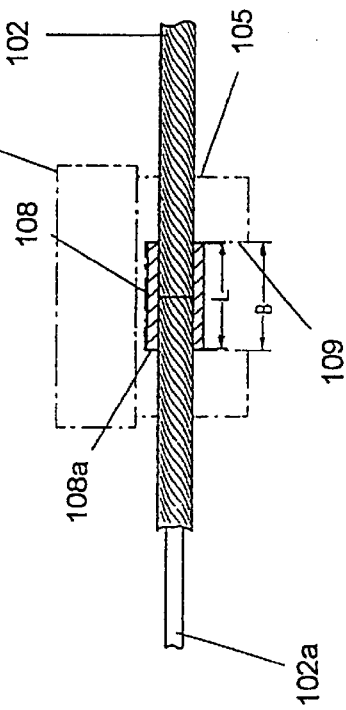

The driver members are essentially shorter, seen along the wire 102 in the assembled condition, than the cutting element carriers 104. The recesses 105d of the legs 105b, 105c of the cutting element carriers 4 are thereby made having a width B at least equal to, but preferably slightly larger than the length L (see FIG. 10) of the driver members 108 such that the driver members are received in the recesses in the central area of the cutter element carriers with insignificant play in the longitudinal direction of the wire. Furthermore, the driver members 108 are made having such a dimension that their outer diameter after the fixing by clamping to the wire at least approximately corresponds to the distance between the outer surfaces of the legs 105b, 105c. Thereby, the side edges of the recesses 105d form stop members 109 adapted to contact, i.e. to be brought into functional engagement with, the end edges 108a (see FIG. 10) of the driver members and to thereby provide an indirect connection between the wire 102 and the cutting element carrier 104.

In order to complete the support of the cutting element carriers 104 on the wire 102 riders 106 are fixedly connected to the cutting element carriers 104 in the region of the free lower ends of the legs 105b, 105c. The fixed connection between the riders 106 and their cutting element carriers 104 is in the illustrated embodiment provided by means of riveting—rivets 106a are indicated in FIG. 8—but it is obvious that other methods known in themselves, may be employed for this fixed connection. Apart from completing the assembly of the cutting element carriers 104 and thus to form the actual carrying unit together with the clamps, the riders do, like by the previously embodiment, serve the purpose of guiding the cutting member 101 and of transmitting the driver power. More specifically, the riders 106 do here engage complementary recesses 113a, 112a in the drive wheel 113 and nose wheel 112 respectively, but they could also in this embodiment have the design as described above, for cooperation with teeth on drive wheel and nose wheel.

In view of the above it is obvious that the cutting member 101 according to this embodiment is produced by joining together the wire 102 and by providing the wire with driver members 108 in the manner described above. Thereupon, cutting element carriers 104 having cutting elements 103 brazed thereto, are positioned over the wire 102 such that they straddle the wire and such that a driver member 108 is received in the recess 105d of the legs 105b, 105c. Then, the assembly is completed by connecting a rider to the lower portion of the legs 105b, 105c of the clamp 105, for instance through riveting.

When cutting elements 103 are damaged or become worn out they may relatively easily be replaced by loosening the rivet connection, or the like, between the rider 106 and the clamp 105, whereupon these parts are easily removed from the wire and are replaced by new such parts which are connected to each other in the corresponding manner after they have been put together in the intended position.

In view of the above it is now clear that the basic principle of the invention is that the cutting element carriers 4, 104 are only indirectly connected to the support unit 2, 102 and that they, more specifically, are only indirectly connected thereto through driver members 8, 108 in a central area of their length. Thus, the result is that the flexibility of the wire 2, 102 is practically only effected along a distance corresponding to the length of the driver member, whereas the wire in its other portions, i.e. also in the portions received and straddled respectively by the cutting element carriers maintains at least part of its original, inherent flexibility. In the illustrated embodiment the cutting element carriers 4, 104 are therefore so to say floatingly supported on the support unit in view of the fact that they functionally engage the wire through the contact with the driver members 8, 108 at stops 9b, 109. This provides significant advantages both quite generally for such a cutting member, but predominantly when the saw member is employed on a portable saw. Through the floating support of the cutting element carriers 4, 104 on the support unit 2, 102 in the manner described, the cutting member 1, 101 will be very flexible so that, compared to the prior art, it may be passed around the drive wheel 13, 113, guide bar 11, 111 and nose wheel 12, 112 of the saw 10, 110, with a very small turning radius. This in turn means that the guide bar may be designed having a relatively small height which, employed at a portable saw, has a very favourable effect on the overall weight of the saw, with the resulting improved handling of the saw. Moreover this means that holes or apertures having relatively small dimensions may be taken up in for instance a concrete wall, without any excessive cutting or over-cutting what so ever and still with a large cutting depth. As an example it may be mentioned that when using a 3 mm wire it is quite easily possible to obtain a guide bar height of only 120 mm and at the same time to obtain a cutting depth of 600 mm or more, which in turn means that it is possible to cut through two-brick walls, having a thickness of 500 mm, from one side.

With the described design it is also possible to perform the replacement of damaged or worn out cutting elements at an essentially lower cost, much simpler and thereby quicker than in accordance with the prior art technique, said fact applying especially to the first embodiment where the cutting element carriers 4 are integral, i.e. in one unit.

With the suggested joining together of the wire by using a driver member fixed by clamping a stronger support unit is also achieved, compared to the presently employed chains. As an example it may be mentioned that by the above described joining together of a wire having a nylon core and a "fake splicing" the joint will have a strength lying in the area of 90% of the ultimate tensile strength of the wire.

Although the invention has been described above with specific reference to a presently preferred embodiment thereof, it should be obvious that the invention also comprises such modifications and variations of the basic inventive idea that are obvious to a man skilled in the art. Thus, the cutting element carriers may, in a design being an alternative to the second embodiment, also be supported indirectly on the wire without the use of driver members, whereby the clamp 105 is locked to the wire by means of steel spikes, known in themselves, which are driven preferably through the legs 105b, 105c of the clamp 105 and through the wire. It has been mentioned in the introduction that a saw intended to employ the cutting member according to the invention preferably may be provided with a hydraulic drive motor. This provides for a very simple possibility to reverse the driving direction, and in a further development of the invention the cutting member may thereby, in an application on a saw supported on a stand, be provided with cutting elements having different cutting angles at both end edges—for instance a negative cutting edge angle suitable for cutting concrete at one end and a positive cutting edge engle suitable for cutting off reinforcement bars in the other end—which are used for different materials in accordance with the chosen driving direction. In this manner a simultaneous sharpening may also be achieved at the cutting edge that is not in operation in each case. The scope of the invention should therefore only be restricted by the enclosed patent claims.

What is claimed is:

1. A cutting member for cutting hard materials said cutting member comprising:

a wire having a length and free ends, the free ends being joined together to form an endless wire;

a plurality of carriers disposed along the length of the wire; and a plurality of cutting elements connected to said carriers at regular distances from each other along the full length of the wire, said carriers being supported on the wire and at least in an assembled condition connected to a rider for guidingly engaging a portion of a saw, the cutting element carriers being floatingly supported on a wire and in a central area with regard to their axial extension along the wire are in functional engagement with driver members, said driver members being firmly connected to the wire at regular distances and wherein at least one of the cutting element carriers or riders has a stop arranged to engage one of the driver members on each side thereof for locking the cutting element in the longitudinal direction of the wire.

2. The cutting member according to claim 1, wherein the cutting element carrier and the rider are provided as a unit, connected to each other in one piece.

3. The cutting member according to claim 1, wherein the cutting element carrier and the rider are formed of two separate parts which upon assembly of the wire are connected to each other and which in the assembled condition between them receive the wire and, in a central area with reference to their axial extension, one of the driver members.

4. The cutting member according to claim 1, wherein the driver members comprise metal sleeves threaded onto the wire, said sleeves being clamped to the wire prior to the wire being joined.

5. The cutting member according to claim 1, wherein a wire has a core, and when the wire is joined together to form a joint, the core is removed and the wire ends are spliced together and locked to each other by means of a joint element provided over the joint.

6. The cutting member according to claim 5, wherein the joint element is a driver member, and a cutting element carrier is fitted to the wire at the joint.

7. The cutting member according to claim 1, wherein the cutting element carriers comprise:

carrier portions and rider portions integrally connected to each other, said carrier portions receiving and partially enclosing the wire, said carrier portions provided with apertures and grooves permitting the wire to be inserted into the carrier portions in a direction generally transverse to its longitudinal direction, with the wire received in the carrier portions, fixed in its longitudinal direction, and a driver member is received in the cutting element carriers, between the carrier portions, in a central area of the cutting element carriers, with reference to their axial extension along the wire.

8. The cutting member according to claim 1, wherein the cutting element carriers comprise a generally U-shaped clamp having an upper web facing away from the wire and to which a cutting element is connected, and from which two legs extend downwardly as to straddle the wire, each leg in a central area including a recess having a width in the longitudinal direction of the wire which is equal to or slightly exceeds a length of the driver member, said driver member being received in said recesses, and a rider connected through riveting to the clamp in a region of a lower free end of the legs whereby the clamp and the rider together form a carrier unit of the cutting element carriers.

9. The cutting member according to claim 1, wherein the cutting element carriers are provided with cutting elements having opposite end edges with different cutting. angles at said respective opposite end edges.

10. The cutting member according to claim 1, wherein the riders engage complementary projections or recesses of a drive wheel and a nose wheel respectively of the saw, said riders guide the cutting member between said wheels in a groove of a guide bar, around the guide bar, the drive wheel and the nose wheel and transmit driving power thereto from a drive motor of the saw.

11. A method of forming a cutting member for cutting hard materials comprising the steps of:

providing a support unit in a shape of a wire having a length and free ends joined together to form an endless wire;

attaching at regular distances, along the length of the wire, cutting elements or groups of cutting elements;

connecting each cutting element to a cutting element carrier that is supported on the wire and connecting said carriers to a rider;

guidingly engaging said carriers to a portion of a saw;

floatingly supporting the cutting element carriers on the wire and bringing the carriers into functional engagement with driver members within their axial extension along the wire;

connecting driver members to the wire at regular intervals; and providing a stop for at least one of the cutting element carriers and the riders engaging the driver member at each side thereof for locking the cutting element in the longitudinal direction of the wire.

12. The method of forming a cutting member according to claim 11, comprising the further step of forming the cutting element carriers and the riders as a unit, integrally connecting the carrier portions and the rider portions to each other and mounting by inserting the unit into the carrier portions in a direction generally transverse to a longitudinal direction for receiving the support unit therein fixed in a longitudinal direction.

13. The method of forming a cutting member according to claim 11, comprising the further step of forming the cutting element carriers and riders from two separate parts during assembly on the wire, firmly connecting the cutting element carriers and riders to each other such that in the assembled condition they receive between them the wire and in a central area with regard to their axial extension along the wire, one of the driver members.

14. The method of forming a cutting member according to claim 11, comprising the further step of employing as driver members, metal sleeves; threading the sleeves onto the wire before joining together said wire to form a joint and clamping said metal sleeves to said wire.

15. The method of forming a cutting member according to claim 11, comprising the further step of employing a wire having a core, removing the ends of the wire that are to be joined together, splicing together the wire ends and attaching a joint element over the joint.

16. The method of forming a cutting member according to claim 14, comprising the further step of employing a driver member as a joint element and by mounting a cutting element carrier on the wire at the joint.

\* \* \* \* \*